Henry Gordon Poole
Allen D. Abraham
INVENTORS

BY

Kolisch & Hartwell

Attys.

United States Patent Office 3,510,293
Patented May 5, 1970

3,510,293
MANUFACTURE INCLUDING PURIFICATION OF REACTIVE METALS
Henry Gordon Poole and Allen Detham Abraham, Albany, Oreg., assignors to Oregon Metallurgical Corporation, Albany, Oreg., a corporation of Oregon
Filed July 26, 1966, Ser. No. 567,877
Int. Cl. C22b 5/04, 53/00, 61/02
U.S. Cl. 75—84.4
8 Claims

ABSTRACT OF THE DISCLOSURE

Method for producing purified reactive metals such as titanium and zirconium where a reactive metal halide is reduced within a retort to form as the direct product of such reduction a porous, horizontally extending bed producing a partition dividing the retort into upper and lower regions. After draining of molten by-product produced by the reduction reaction, final impurities are removed by vaporizing them and introducing an inert gas to said upper region and extracting inert gas from the lower region at a lesser pressure, thus positively to produce a flow of such gas through the bed with such gas carrying such impurities.

---

This invention relates to the production of reactive metals such as titanium, zirconium, hafnium, etc. in their pure state, and more particularly to a method for reducing a halide of such metals and purifying the reduction product formed.

Considering by way of example the production of titanium, it is common in producing such metal to reduce its halide with a reducing metal such as magnesium, sodium, potassium, etc. Titanium tetrachloride is frequently used, which is introduced over a period of time to a mass of molten magnesium, with the tetrachloride then being reduced according to the following equation:

$$TiCl_4 + 2Mg \rightarrow 2MgCl_2 + Ti$$

In such a reduction reaction, a porous titanium sponge is formed, containing certain entrapped residuals, including the by-product magnesium chloride. Titanium subchlorides tend to be produced in the reduction reaction, and ordinarily, an excess of magnesium is utilized in the reaction to minimize the formation of these subchlorides. Thus there will be found in the sponge, in addition to magnesium chloride, a certain amount of magnesium and minor amounts of subchlorides, such as $TiCl_2$ and $TiCl_3$.

Further describing the reduction reaction, magnesium when reacted with titanium tetrachloride is reduced to molten form, and floats on the by-product magnesium chloride as the same is produced. Titanium tetrachloride in liquid form is introduced to the magnesium by allowing it to cascade downwardly onto a pool of the magnesium. Much of the titanium tetrachloride flashes to a vapor on being introduced to the heated retort containing the magnesium. Titanium sponge forms where the reaction of the titanium tetrachloride with the magnesium takes place, which is generally in a zone adjacent the level of the surface of the molten pool of magnesium.

A demand exists for titanium and other reactive metals having a relatively high degree of purity. Various methods have been proposed in the past for purifying the product of the reduction reaction described, including vaporizing the impurities and removing them by distillation procedures. We have developed a process which utilizes an inert gas circulated through a retort containing sponge, with the circulated gas being effective to remove impurities by sweeping the impurities while in vaporized form from the retort. Such a process has the advantage of enabling atmospheric or near atmospheric pressures to be maintained in the retort, as opposed to the vacuum conditions which are required in a distillation type of process. In any such process relying upon the vaporization of impurities, the rate at which the impurities are removed decreases as the concentration of the impurities lessens, and to obtain a final product having a high degree of purity, the purification must be carried on for a considerable period of time. Thus, in obtaining maximum production from any facility it is highly desirable that procedures be employed that promote separation of impurities from the product of the reduction reaction and their removal from the reduction product.

One general object of this invention, therefore, is to provide improved method for purifying a reactive metal product, utilizing an inert gas flow through a porous bed of the product, under conditions whereby the relatively fast rate of purification is realized.

More specifically, this invention features a process for purifying a metal product produced by the reduction of the halide of the metal, wherein the metal product is prepared distributed as a porous bed dividing the interior of a retort into two regions, with one located above and one located below such bed. Purification is performed by heating the contents of the retort and by passing at close to atmospheric pressure an inert gas through the bed with such passing from one to the other of such regions thus to effect removal of impurities in vaporized form.

A related object is to provide such a method where the inert gas stream is introduced to the upper of such regions, and extracted from the lower region, so that gas flow is downwardly through the bed, and the direction of gas flow supplements gravity in producing a flow of molten impurities downwardly from the bed into the region below.

It is contemplated, in a preferred embodiment of the invention, that the reduction of the metal halide and purification be carried out in the same retort, which greatly simplifies handling problems. With such an organization, a salt by-product forms during the reduction part of the process which collects as a molten pool in the base of the retort below a bed of sponge, and it should be obvious that the contents of this pool should not flow uncontrollably from the retort during the reduction part of the process through piping provided to perform the subsequent purification part of the process. It is, therefore, another object to provide an organization wherein the inert gas which is extracted from the retort from a region disposed below the bed is channeled upwardly through an upright standpipe, which pipe by extending upwardly from an open intake at its base inhibits unwanted flow of molten reductant or by-product from the retort through the pipe during the reduction of the titanium tetrachloride. Another feature is that the base of this standpipe is sealed off by molten material within the retort prior to the introduction of titanium tetrachloride, which prevents titanium tetrachloride vapor from passing into the standpipe and the formation of sponge within the pipe.

A related object is to provide such a process wherein the channeling of the inert gas between upper and lower regions in a retort is performed by a standpipe located within the retort. Thus the standpipe is maintained at the temperature within the retort. Further, should any leakage develop within the standpipe such is not leakage to the atmosphere.

Another object is to provide a process where the inert gas is preheated prior to its introduction to the retort during the purification part of the process.

These and other objects and advantages are attained by the invention, and the same is described hereinbelow in conjunction with the accompanying drawings, wherein.

Figure 1:
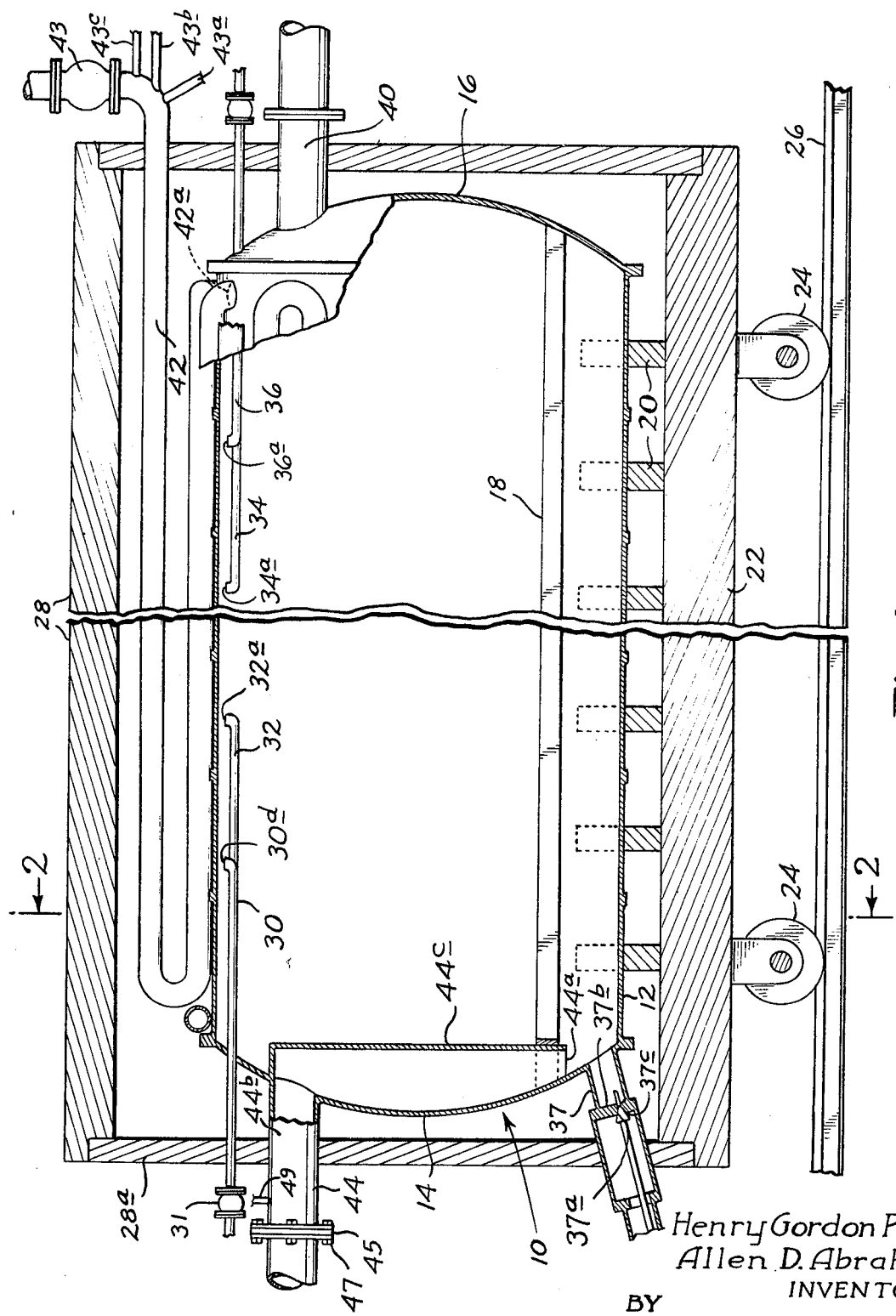
FIG. 1 is a side elevation, somewhat simplified, illustrating portions of a furnace and showing lodged within the furnace a retort, such as may be utilized in carrying out the invention.
Figure 2:
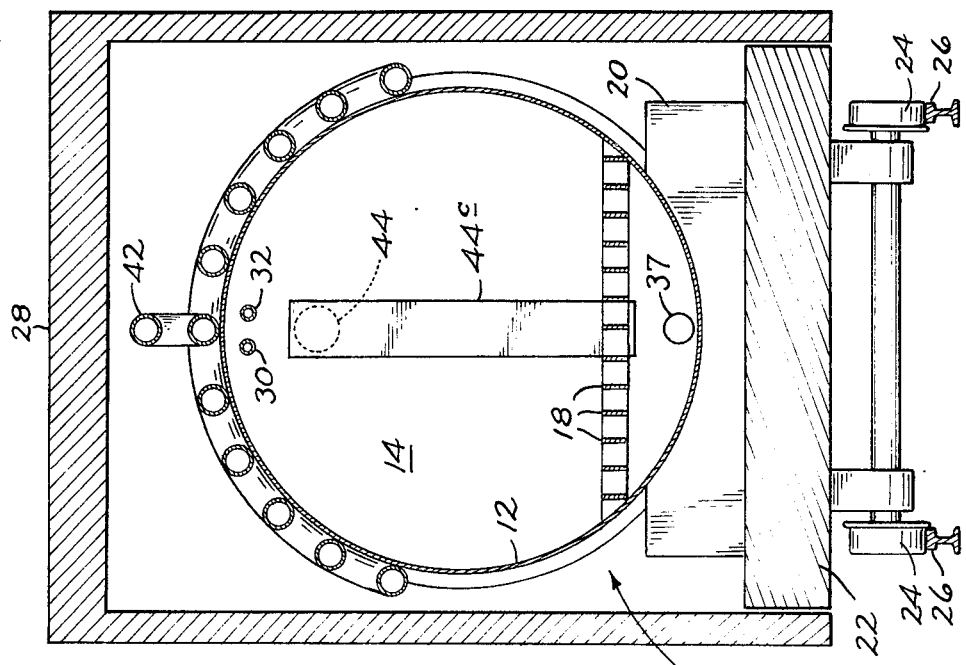
FIG. 2 is a cross-sectional view, taken generally along the line 2—2 in FIG. 1, further illustrating details of the retort employed.

Referring now to the drawings, an iron retort or reaction vessel may be employed for the reduction and subsequent purification process, which may take the form of an elongated hollow cylinder closed at opposite ends and disposed with the axis thereof horizontal. The retort, shown at 10 in FIG. 1, thus includes a cylindrical shell 12 and end walls 14, 16 which close off the ends of the shell. In production of titanium from the halide of the metal, and using magnesium as a reducing metal, the retort is first charged with magnesium by placing blocks of the magnesium on a reactor grid mounted within the retort, such as the one shown at 18, which spans the shell at a slight elevation above the base of the retort. The grid, which is a perforate supporting platform, may take the form of multiple, elongated, parallel rails, laterally spaced apart from each other to accommodate gas flow between the rails between regions located above and below the grid.

Retort 10 is shown supported on cradle structure 20 mounted on a car hearth 22. Flanged wheels 24 on the underside of the car hearth support it for rolling movement over rails 26. The car hearth enables the retort to be moved readily into and out of the confines of a furnace partially shown at 28.

The furnace has walls and a ceiling made of the usual refractory lining. It may also include doors such as those indicated at 28a which are brought together to produce an enclosure completely surrounding the retort. The sides of the furnace may be suitably apertured to accommodate gas burners (not shown) which provide the heat in the furnace when the same is operated.

Certain piping is illustrated in connection with the retort which is utilized for the introduction and withdrawal of material from the retort. Specifically, shown extending into the retort from opposite end walls are pipes 30, 32, 34, and 36. These have upturned ends, shown at 30a, 32a, 34a, and 36a, which communicate with the interior of the retort. In the production of titanium, titanium tetrachloride flows into the retort through these pipes with such bubbling out from the upturned ends described, whence the tetrachloride cascades to the base of the retort while turning into a vapor. It will be noted that the upturned ends are spaced at modules extending along the length of the retort. Because of this spacing, and because of the breaking up of the streams of liquid titanium tetrachloride and flashing of the tetrachloride into vaporous form which occurs on such being discharged from the upturned ends, the tetrachloride becomes distributed uniformly within the retort. Flow of tetrachloride through pipes 30, 32, 34, and 36 is controlled by manipulation of suitable valves, such as valve 31.

Extending into the retort from the left end thereof in FIG. 1 is a pipe 37. This pipe opens up to the interior of the retort below grid 18 and provides a drain through which molten material may be tapped from the retort. Flow through pipe 37 is controlled through opening and closing a bore 37a provided in a wall 37b which spans pipe 37 in a region located within the confines of the furnace. An air cooled conically-shaped stopper element 37c is advanced into the bore 37a to close it off, and backed off from the bore or moved to the left in FIG. 1 to open up the bore whereby fluid flow may take place through the pipe 37.

Shown connecting with the right end of the retort in FIG. 1 is a pipe 40 which comprises a blow-off pipe in the apparatus. The pipe extends out through the furnace and thence connects with valve mechanism (not shown) provided for opening and closing the pipe.

As already briefly discussed, purification of the reduction product is performed by circulating an inert gas through the retort and such circulation of gas is accomplished by introducing the gas through an inlet conduit 42 and extracting the gas through an outlet conduit 44.

Describing details of the inlet conduit, as shown the conduit comprises a pipe which extends in elongated reaches substantially paralleling the length of the retort disposed adjacent the top and upper sides of the retort. At end 42a the pipe communicates with the retort's interior. Inert gas, prior to being recirculated into the retort, is subjected to a process whereby impurities removed by the gas are separated from the gas. This separation in the apparatus contemplated is performed with substantial cooling of the gas. By including the elongated reaches described in connection with conduit 42, gas flowing through the conduit is preheated prior to being introduced into the retort. By preheating the gas to a temperature approximating the temperature within the retort, cooling of vaporous impurities inside the retort by the gas is inhibited, which results in more efficient sweeping of the impurities from the retort.

Shown at 43 is a valve controlling flow through inlet conduit 42. Pipes shown at 43a, 43b, and 43c connect with a vacuum source (for evacuating the system), a supply of inert gas, and a pressure monitor (not shown). Suitable valves, also not shown, are present for closing off the various conduits when desired.

Upon reducing the halide with magnesium, a porous sponge bed forms over the grid which extends upwardly, in the usual instance, approximately half the height of the reactor or retort. This sponge bed extends continuously between the end walls and sides and forms a partition or divider separating the retort into two regions, one disposed over the bed of sponge and one disposed under the grid. End 42a of the inlet conduit which communicates with the retort adjacent its top thus communicates with the upper of these two regions.

Considering now outlet conduit 44, this includes an upwardly extending vertical reach 44c within the retort which constitutes what is referred to herein as a standpipe. In FIG. 1 the left-hand wall of this standpipe actually comprises part of the end wall 14. Indicated at 44a is an open bottom end for conduit 44 which is located directly adjacent the base of grid 18. Thus, the outlet conduit communicates inside of the retort with the lower of the two regions mentioned above. The conduit leaves the retort through a horizontal reach shown at 44b. Located outside the furnace (and thus not having to withstand the heat of the furnace) is means for closing off the outlet conduit in the form of a plate 45 which is inserted between flanges joining two sections of the conduit 44 together. To open up the conduit fasteners 47 connecting these flanges are removed to enable removal of the plate 45. With the plate removed the flanges may again be attached together, to join the conduit sections, which places the retort in communication with purification apparatus for the circulated gas, to be described.

Shown at 49 is a line through which inert gas can be introduced to conduit means 44. During the reduction of titanium tetrachloride, plate 45 is in place, as illustrated, closing off outlet conduit 44. With a pressure within the retort exceeding atmospheric pressure, molten material (magnesium) will tend to be forced upwardly into the standpipe through its open bottom end. By introducing inert gas through line 49, a pressure condition may be produced within the standpipe preventing such an accumulation of magnesium within the standpipe. By noting the level of pressure required completely to clear the standpipe of molten material, and the pressure of inert gas within the retort at this time, the level of molten material within the retort can be determined. It should be understood that a valve is provided (not shown) for opening and closing line 49.

The standpipe is located inside the retort and thus the temperature within the standpipe is substantially the same as the temperature within the retort. Because the standpipe extends upwardly from an open bottom end, and by providing means for controlling the pressure within the standpipe, unwanted flow of molten material through this standpipe during the reduction part of the process may be prevented. It should also be noted that the standpipe has a square cross section, which is a cross section of non-diminishing side-to-side dimension progression from the inside of the retort toward end wall 14. Because of this construction, sponge which is produced within the retort is prevented from forming on the back of the standpipe in such a way as to produce encirclement of the pipe and inhibit removal of end wall 14 at such time as the retort is to be opened up at the end of the processing. The end wall on being cut away from shell 12 is easily backed off from the retort, without the sponge interfering with such movement.

According to this invention, purification of the metal product produced in the retort by the reduction of the metal halide is carried out with atmospheric or close to atmospheric pressure within the retort. This eliminates the need for a vacuum furnace as required by certain types of presently known apparatus, and the same furnace may be used to heat the retort during purification as was used in the reduction part of the process. Purification is performed by vaporizing impurities, and then sweeping such impurities from the retort by circulating an inert gas, such as argon or helium, through the retort with such passing downwardly through the reaction product which is prepared as a porous sponge extending over the reactor grid. This purification is performed with the inside of the retort heated to a temperature which is above the melting point of the impurities, whereby such are in molten form and have a relatively high vapor pressure. The passage of the inert gas downwardly through the sponge bed on its travel from the inlet to the outlet conduit promotes thorough mixing of the inert gas with the vapors sought to be removed. Further, such downward travel supplements the action of gravity in promoting the flow of molten impurities downwardly through the interstices of the bed to a region adjacent the lower surface of the bed where the impurities are best exposed for vaporization and removal.

On the inert gas leaving the retort, impurities are separated from the gas, and the gas is then recirculated. Apparatus and a method for performing such cleansing of the recirculated gas is discolsed in a prior filed application entitled "Reduction and Purification of Reactive Metals," having Ser. No. 498,500, filed Oct. 12, 1965, and in a copending application of even filing date entitled "Purification of Contaminated Reactive Metal Products," now U.S. Pat. 3,356,491.

Figure 3:
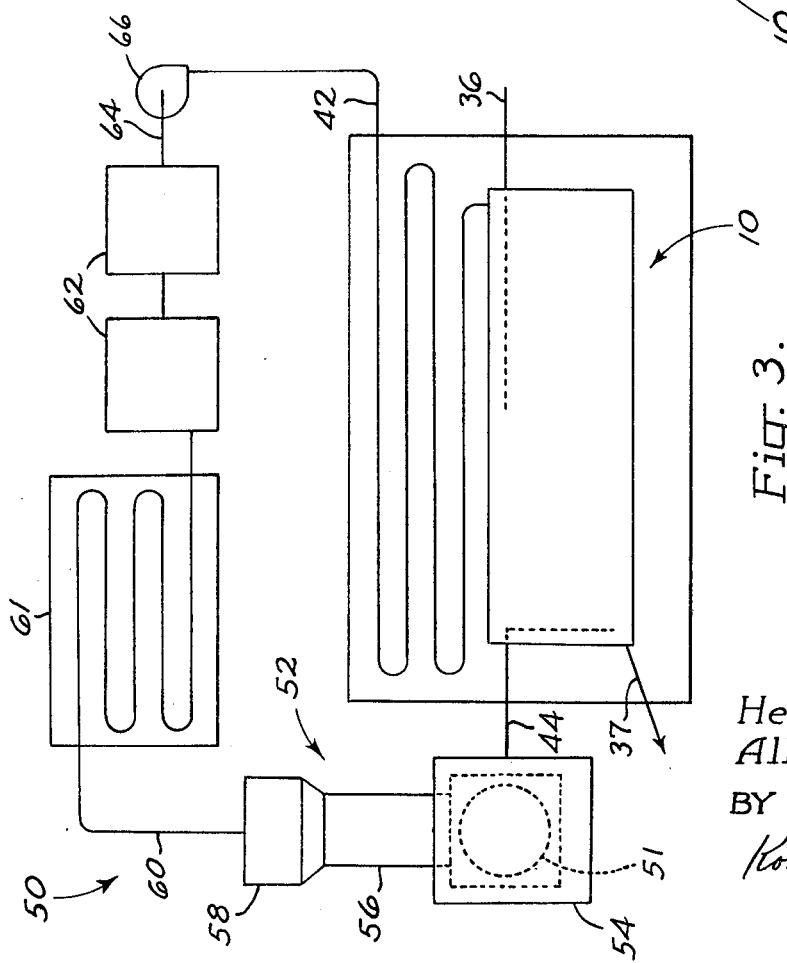
FIG. 3 is a simplified schematic diagram, illustrating how an inert gas stream may be circulated through the retort with the gas stream sweeping the retort to produce purification of the contents thereof.

In FIG. 3, such equipment for removing impurities from the recirculated gas is shown schematically, and given the reference numeral 50. Referring to the figure, it will be noted that outlet conduit 44 extends from the retort and communicates with the interior of what is referred to herein as a collecting retort 51 of a hot condenser assembly designated generally at 52. Retort 51 is located within a furnace 54, with walls made of the usual refractory furnace lining, and provided with suitable gas burners for heating the retort lodged therein. Under normal operating procedures and during the circulating of inert gas to sweep retort 10 of its impurities, no external heat is applied to retort 51 and the temperature within retort 51 will stabilize at a level only slightly below the melting point of the impurities carried by the gas stream into the retort.

Above the collecting retort there is shown a stack 56 which has mounted on the top thereof a filter housing 58. Within this filter housing are the usual filter elements, which operate to filter out solid particles from the gas stream passing through the filter elements and into a conduit 60 leading out from the top of the filter housing. Gas flow from retort 10 is thus into the collecting retort where some condensation to solid particles takes place of impurities carried by the gas stream, and thence into the base of the stack (which is ordinarily water cooled) where complete condensation takes place. The gas thence passes through the filter elements within the filter housing, and solid particle material condensed within the hot condenser assembly and collecting on the filter elements tends to fall back into retort 51 there to be collected.

From conduit 60, which may be water cooled as by the jacket assembly shown schematically at 61 further to reduce gas temperature, the gas travels into one or more cold filter units 62, where remaining condensed impurities carried by the gas stream are separated from the gas stream. The cold filter units also include the usual filter elements upon which particles collect with passage of gas through the filter elements.

Gas on leaving the cold filter units travels through a conduit 64 to the inake side of a pump 66. The pump recirculates the now cleansed gas to retort 10 through feed conduit 42, with the pressure of such inert gas on entering retort 10 ranging typically from about 0.25 to 5 p.s.i.g.

Following the invention, a sponge bed has been produced in retort 10 which ranges from about 8 to 24 inches in thickness, and the pressure drop of the gas traveling across this bed may range from about 0.4 to 2.5 p.s.i.g. If the pressure drop noted across the bed falls below this range, this is indicative of the fact that there has been improper preparation of the bed, and that the bed contains a hole or holes providing a by-pass whereby gas flow is not through the interstices of the main body of the sponge. With a pressure drop substantially exceeding the indicated range, higher pressures are required in the retort, which has the disadvantages of increasing the chance of gas leakage, requiring pressure-type equipment, etc.

Describing now the manufacture of a reactive metal, and its subsequent purification, initially a charge of about 16,000 pounds of magnesium was placed in retort 10 in the form of magnesium bricks distributed over the top of grid 18. The retort was then closed by welding the end walls in place, and conduit 44 closed with plate 45. Other valve adjustments were made to produce a closed system of the retort, and the retort was then evacuated and backfilled with helium to produce a pressure of 0.5 p.s.i.g. within the retort.

With the retort placed within the furnace and the furnace doors closed the furnace was started to raise the temperature of the walls of the retort to about 800° C. Such heating produced a pool of molten magnesium from the magnesium bricks with the surface of such pool being located somewhat above the top of the grid 18, and at a sufficient level to seal off open end 44a of the standpipe from the interior of the retort. Approximately 46,700 pounds of liquid titanium tetrachloride was then fed into the retort through pipes 30, 32, 34, and 36, at an initial rate of about 1,000 pounds per hour for the first few hours, which rate was then increased to about 3,000 pounds per hour. The time required for the addition of the tetrachloride was about 17 hours. During this addition of titanium tetrachloride the walls of the retort were maintained at a temperature ranging between about 800–920° C. Inert gas, i.e. helium, was being bled from the retort through blow-off pipe 40 so as to maintain the pressure within the retort below about 3.5 p.s.i.g.

After about 60% of the titanium tetrachloride had been added, and the lapse of about 10 hours, molten by-product magnesium chloride which formed as a pool underlying a molten pool of magnesium, was drained from the retort through conduit 37. The draining of the molten magnesium chloride was effective to maintain the surface of the molten pool of magnesium which floated on the molten salt in a region extending from the top of the reactor grid to a level some 10–24 inches above the top of this grid.

At the conclusion of the addition of all the titanium tetrachloride, the retort was allowed to sit while heated during a soak period of about three hours, during which time any residual tetrachloride vapors within the retort were allowed to react. During the addition of the tetrachloride and subsequent soak period, no tetrachloride vapors were permitted to enter the standpipe by reason of the seal produced for the open bottom end of the standpipe by the molten pool of material residing along the base of the retort. With the conclusion of the soak period, all molten material in the retort not retained by the sponge was tapped through conduit 37. About 2,200 pounds of titanium sponge had formed in the retort which was distributed as a thick bed of about 14 inch thickness over the reactor grid. Estimated to be contained in the sponge was about 4,000 pounds of unreacted magnesium, and 4,000 pounds of impurities, comprising magnesium chloride and titanium subchlorides.

Upon the completion of the reduction reaction and after draining of all magnesium chloride, and with equipment 50 provided for removing impurities from the recirculated gas including the hot condenser assembly evacuated and backfilled with helium (normally, such is already standing in a ready state), plate 45 was removed and conduit 44 connected to retort 51. Valve 43 was opened to make retort 10 and equipment 50 for separting impurities from the recirculated gas all part of a single closed system. Pump 66 was then started to produce circulation of helium from inlet conduit 42 into the region above the sponge bed within the retort, through the sponge bed, and thence through the standpipe 44c to retort 51. A gas flow through conduit 42 resulted of approximately 1,000 cubic feet per minute. A pressure on the downstream side of the pump of about 4 p.s.i.g. was sufficient to produce proper circulation and pressure conditions within retort 10.

During the circulation of the inert gas through the equipment the furnace was heated to maintain a temperature in the retort of about 1,025° C. The temperature of the retort in the hot condenser assembly was approximately 400° C., and the temperature of the helium gas leaving the filters within the filter housing 58 was about 300° C. The inert was after passing through the cold filter units and on entering the pump had a temperature of about 65° C., a temperature low enough to prevent damage to the pump.

Purification with sweeping of inert gas through the retort was continued for approximately 60 hours. During this time the impurities in the form of magnesium, and magnesium chloride, collected within the hot condenser and to a minor degree within the cold filter units. At the conclusion of the purification process the furnace for retort 10 was shut off and the retort cooled to 600° C. The retort was then removed from the furnace and permitted to cool to room temperature. Air was then gradually admitted to the retort to condition the sponge therein. The end walls were then removed and a bed of titanium sponge was noted disposed over the reactor grid comprising pure titanium containing not more than about 0.1% chlorine.

During the initial hours of purification by sweeping with an inert gas, some molten impurities tend to collect as a pool at the base of the retort, which may be removed by tapping the retort.

During the reduction of the tetrachloride with magnesium, the level of the surface of the magnesium pool may be assumed to have been maintained approximately between the base and the top of the bed of sponge which formed, since reduction to form sponge takes place approximately where the tetrachloride comes in contact with magnesium vapors which is directly above the magnesium pool. This level, it will be noted, was controlled by draining at periodic intervals of the by-product magnesium chloride as such formed. Reach 44c or the standpipe of outlet conduit 44 extends within the retort to an elevation well above the top of the sponge bed formed, and thus the level of the top of the pool of magnesium which produced the sponge. This prevents any flow under the urging of gravity of molten material from the retort through conduit 44. With a pressure within retort 10 slightly exceeding atmospheric pressure, there will be some tendency for molten material to be forced upwardly into the standpipe through its open bottom end, but any flow out from the retort through the pipe or conduit 44 is readily prevented through suitable adjustment of the pressure within the standpipe utilizing line 49, as already described.

The only valving required in the organization which must withstand the temperature conditions within the furnace is that which controls flow of molten material through conduit 37. Conical stopper element 37c and related structure are well adapted for withstanding the temperature conditions involved, and provide desired control of fluid flow through conduit 37.

In some installations it may be desirable to perform tapping of the molten magnesium chloride utilizing conduit 44. To produce flow through the standpipe a pressure condition is produced within the retort which is sufficient to cause molten material to be forced up through the standpipe and into horizontal reach 44b. With such a modification of the invention, the valve provided by plate 45 would be unnecessary.

Inert gas on passing through the elongated reaches of inlet conduit 42 which are located within the furnace was preheated to a temperature close to 1,000° C., which temperature, of course, is well above the melting points of magnesium and magnesium chloride, and the gas on entering retort 10, therefore, produced minimum cooling of the materials within the retort.

In the case of the manufacture of a reactive metal, such as zirconium or hafnium, the halide is a solid and the retort is initially charged with the solid halide as well as with a mass of reducing metal, such as magnesium. With such manufacture, the inlet pipes described for the tetrachloride described are not necessary. Reduction of the tetrachloride in the case of such other reactive metals takes place by sublimation of the halide, with halide vapors traveling in the retort to the region of the reducing metal.

With downward flow of the inert gas through the bed during the purification step, the traveling gas stream cooperates with gravity in producing exposure of residuals in the porous sponge facilitating vaporization of the residuals.

It will be noted that according to this invention the region below the reactor grid during the reduction part of the process is utilized as a region for holding the magnesium while in molten form and for holding molten by-product, primarily magnesium chloride, after such forms. During the purification part of the process this region is drained of its contents and is maintained at a pressure lower than the pressure of the region above the bed, whereby it functions in the organization to promote gas flow in a given direction through the sponge bed formed.

While an embodiment of the invention has been described, obviously modifications and variations are possible without departing from the invention.

It is claimed and desired to secure by Letters Patent:

1. In the production of a reactive metal by the reduction of a halide of the metal with a reducing material, the method comprising reducing such halide of the metal within a retort to prepare a reduced product comprising reactive metal together with impurities, as the direct product of the reduction of such halide forming such reduced product within the retort as a porous horizontally extending bed with such producing a partition dividing the retort into upper and lower spaced regions separated from each other by said bed, vaporizing the impurities contained in said reduced product, and introducing inert gas to one of said regions and extracting inert gas from the other of said regions to produce a pressure differential of gas between the two regions and a positively induced flow of such gas through said bed that divides the retort with such gas carrying with it impurities vaporized in the retort.

2. The method of claim 1, wherein the impurities are vaporized by heating the contents of the retort to a temperature above the melting point of the impurities, and the inert gas when introduced to said one of said regions is heated to a temperature above the melting point of the impurities.

3. The method of claim 1, wherein the inert gas is introduced to the upper of said regions and extracted from the lower of said regions, the gas flows downwardly through the bed while traveling from one to the other of said regions, with such downwardly flowing gas promoting flow of molten impurities downwardly through said bed into said lower region.

4. The method of claim 3, wherein the reduction of the halide of the reactive metal is accompanied with the production in said lower region of the retort of a pool of molten by-product which is the halide of reducing material, and a passage is provided used during the extraction of the inert gas from said lower region which connects with said lower region and extends upwardly from said pool whereby uncontrolled flow by gravity of molten by-product during the reduction of the halide of the reactive metal through the passage used in the extraction of the inert gas is prevented.

5. The method of claim 4, wherein said passage is located inside of said retort whereby said inert gas during extraction is channeled upwardly from said lower region within said retort.

6. The method of claim 1, wherein the reduction of the halide of the reactive metal is accompanied with the production of a molten by-product which is the halide of the reducing material which collects in said retort in said lower region below said bed, and said molten by-product is drained from said retort to clear said lower region prior to the introduction of the inert gas.

7. The method of claim 6, wherein the inert gas is extracted from said lower region, and a passage is provided for the inert gas extracted from said lower region which extends upwardly from said lower region and through said upper region, whereby uncontrolled flow of the molten by-product through said passage during the reduction of the reactive metal halide is prevented.

8. The method of claim 3, wherein the reactive metal produced comprises titanium, which is formed by the reduction of titanium tetrachloride with magnesium, with the production of by-product magnesium chloride, and wherein the contents of the retort is heated to a temperature above the melting point of magnesium chloride during the introduction and extraction of inert gas.

References Cited

UNITED STATES PATENTS

| 2,663,634 | 12/1953 | Stoddard et al. | 75—84.5 |
| 2,745,735 | 5/1956 | Byrns | 75—84.5 |
| 2,766,113 | 10/1956 | Chisholm et al. | 75—84.5 |
| 2,772,875 | 12/1956 | Levy | 75—84.5 X |
| 2,778,726 | 1/1957 | Winter et al. | 75—84.5 |
| 2,787,539 | 4/1957 | Conklin | 75—84.5 |
| 2,983,600 | 5/1961 | Blue et al. | 75—84.5 |
| 3,158,671 | 11/1964 | Socci | 75—84.5 X |
| 3,252,823 | 5/1966 | Jacobson et al. | 75—84.5 X |

HENRY W. TARRING II, Primary Examiner

U.S. Cl. X.R.

75—84.5